United States Patent Office 3,352,777
Patented Nov. 14, 1967

3,352,777
OXIDATION OF MERCAPTANS
Allen K. Sparks, Des Plaines, Ill., assignor to Universal Oil Products Company, Des Plaines, Ill., a corporation of Delaware
No Drawing. Filed Dec. 9, 1964, Ser. No. 417,202
13 Claims. (Cl. 208—206)

ABSTRACT OF THE DISCLOSURE

Acceleration of the rate of oxidation of mercaptans in contact with phthalocyanine catalyst by means of a salt having a cation selected from the group consisting of a metal in the left-hand column of Group I and left-hand column of Group II of the Periodic Table and an anion selected from the group consisting of sulfate, halogen, nitrate, nitrite, carbonate, acetate and benzoate.

---

This invention relates to the oxidation of mercaptans. In one embodiment it is directed to the oxidation of mercaptans contained in hydrocarbon distillates. In another embodiment it is used for effecting regeneration of alkaline solutions which previously had been used to extract acidic components from organic substrates and particularly hydrocarbon distillates. In still another embodiment it is used for the oxidation of mercaptans derived from any suitable source.

A very effective catalyst for accomplishing the oxidation of mercapto compounds, including mercaptans contained in hydrocarbon distillates or mercaptides contained in used alkaline solutions, is a metal phthalocyanine, details of which will be hereinafter set forth. While this catalyst is very active, it always is desired to accelerate the rate of the oxidation reaction. In addition to accelerating the rate of the oxidation reaction of readily oxidizable mercaptans, it is desired to improve the process to effect oxidation of the difficultly oxidizable mercaptans. In general, the more difficultly oxidizable mercaptans are the higher boiling mercaptans which, for example, are contained in higher boiling hydrocarbon distillates including kerosene, jet fuel, aromatic solvent, stove oil, range oil, gas oil, diesel fuel, fuel oil, lubricating oil, etc. Accordingly, the present invention offers the two-fold advantage of (1) accelerating the rate of oxidation of readily oxidizable mercaptans as contained in gasoline, naphtha, normally gaseous hydrocarbon fractions, etc., and of (2) both accelerating the rate oxidation of readily oxidizable mercaptans and effecting oxidation which otherwise may not occur of the difficultly oxidizable mercaptans contained in the higher boiling distillates hereinbefore set forth. In another embodiment the novel features of the present invention may be utilized for purifying other organic fractions containing certain acidic impurities, the other organic compounds including alcohols, ketones, aldehydes, etc.

In one embodiment the present invention relates to a process for oxidizing a mercapto compound which comprises reacting said mercapto compound with an oxidizing agent in the presence of a phthalocyanine catalyst and a salt having a cation selected from the group consisting of a metal in the left-hand column of Group I and left-hand column of Group II of the Periodic Table and an anion selected from the group consisting of sulfate, halogen, nitrate, nitrite, carbonate, acetate and benzoate.

In another embodiment the present invention relates to a method of treating a sour hydrocarbon distillate which comprises reacting said distillate with air in the presence of an alkaline reagent, cobalt phthalocyanine sulfonate and sodium sulfate.

In still another embodiment the present invention relates to a method of regenerating used caustic solution which comprises reacting the same with air in the presence of vanadium phthalocyanine sulfonate and sodium chloride.

Any suitable phthalocyanine catalyst is used in the present invention and preferably comprises a metal phthalocyanine. Particularly preferred metal phthalocyanines comprise cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanine in general is not readily soluble in aqueous solutions and, therefore, for improved operation is preferably utilized as a derivative thereof. A preferred derivative is the sulfonated derivative. Thus, a particularly preferred phthalocyanine catalyst comprises cobalt phthalocyanine sulfonate. Such a catalyst comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 20% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

As hereinbefore set forth, while the phthalocyanine catalyst is very active, it is desirable to even further accelerate the rate of the oxidation reaction. In addition, undesired discoloration which sometimes occurs in the oxidation of high boiling mercaptans is reduced when the oxidation is effected in accordance with the present invention.

It has been found that the rate of oxidation of the mercapto compound can be increased substantially by the addition of a water soluble, chemically inert salt to the caustic solution. The salt is defined as having a cation selected from a metal in the left-hand columns of Groups I and II of the Periodic Table and an anion selected from sulfate, halogen, nitrate, nitrite, carbonate, acetate and benzoate. Of the metals in Groups I and II of the Periodic Table, sodium, potassium and lithium are particularly preferred. Other metals in the left-hand column of Group I include rubidium and cesium but generally these metals are more expensive and therefore may not be preferred for economic reasons. Of the metals in the left-hand column of Group II of the Periodic Table, magnesium, calcium and strontium are preferred. Other metals in Group II of the Periodic Table include beryllium and barium.

Illustrative salts for use in the present invention include sodium sulfate, sodium chloride, sodium bromide, sodium iodide, sodium fluoride, sodium nitrate, sodium nitrite, sodium carbonate, sodium acetate and sodium benzoate, potassium sulfate, potassium chloride, potassium bromide, potassium iodide, potassium fluoride, potassium nitrate, potassium nitrite, potassium carbonate, potassium acetate and potassium benzoate, lithium sulfate, lithium chloride, lithium bromide, lithium iodide, lithium fluoride, lithium nitrate, lithium nitrite, lithium acetate, lithium benzoate, and hydrated forms thereof. As hereinbefore set forth, similar salts of rubidium and cesium also may be employed but generally are not preferred because of the higher cost.

Additional illustrative salts for use in the present invention include beryllium sulfate, beryllium chloride, beryllium bromide, beryllium iodide, beryllium fluoride, beryllium nitrate, beryllium nitrite, beryllium carbonate, beryllium acetate, beryllium benzoate, magnesium sulfate, magnesium chloride, magnesium bromide, magnesium iodide, magnesium fluoride, magnesium nitrate, magnesium nitrite, magnesium carbonate, magnesium acetate, magnesium benzoate, calcium chloride, calcium bromide, calcium iodide, calcium fluoride, calcium nitrate, calcium nitrite, calcium carbonate, calcium acetate, calcium benzoate, strontium chloride, strontium bromide, strontium iodide, strontium fluoride, strontium nitrate, strontium nitrite, strontium carbonate, strontium acetate, strontium benzoate, barium chloride, barium bromide, barium iodide, barium fluoride, barium nitrate, barium nitrite, barium carbonate, barium acetate, barium benzoate, and hydrated forms thereof.

In a preferred embodiment, oxidation of the mercaptan is effected in the presence of an alkaline solution. As hereinbefore set forth, another embodiment of the invention comprises regeneration of alkaline solutions which have been used to extract acidic components from organic substrates and particularly hydrocarbon distillates. Any suitable alkaline solution is employed. A preferred reagent comprises an aqueous solution of an alkali metal hydroxide such as sodium hydroxide (caustic), potassium hydroxide, etc. Other alkaline solutions include aqueous solutions of lithium hydroxide, rubidium hydroxide, cesium hydroxide, etc., although, in general, these hydroxides are more expensive and therefore usually are not preferred for commercial use. Preferred alkaline solutions are aqueous solutions of from about 1% to about 50% and more particularly from about 5% to about 25% by weight concentration of the alkali metal hydroxide. While water is the preferred solvent, it is understood that other suitable solvents may be used including, for example, alcohols, ketones, etc., and preferably aqueous mixtures of these solvents.

The phthalocyanine catalyst generally is used in a small concentration which may range from 10 to 1000 and preferably from 10 to 200 parts per million by weight of the alkaline solution, although lower or higher concentrations may be used when advantages appear therefor. In general, the use of higher concentrations is unnecessary but, if desired, may range up to 25% or more by weight of the alkaline solution. The concentrations of the added salt of the present invention may vary over a wide range, and in general, the larger the amount thereof, the greater is the rate of reaction. Accordingly, the salt may be used in a concentration up to the saturation point in the particular alkaline solution used in the process. As a lower range, the salt preferably is used in a concentration equal to that of the phethalocyanine catalyst.

Treating of the sour hydrocarbon distillate is effected by oxidation of mercaptans. Accordingly, an oxidizing agent is present in the reaction. Air is preferred, although oxygen or other oxygen-containing gas may be utilized. In some cases the sour petroleum distillate may contain entrained oxygen or air in sufficient concentration to accomplish the desired sweetening, but generally it is preferred to introduce air into the reaction. The amount of air must be sufficient to effect oxidation of the mercaptans, although a moderate excess thereof generally is not objectionable.

Oxidation of mercaptans, sweetening of hydrocarbon distillates and regeneration of used alkaline solutions in the presence of the phthalocyanine catalyst and the added salt is effected at any suitable temperature which may range from ambient (50–90° F.) to 200° F. when operating at atmospheric pressure or up to 400° F. or more when operating at superatmospheric pressure. In general, it is preferred to utilize a slightly elevated temperature which may range from about 100° F. to about 175° F. Atmospheric pressure or superatmospheric pressure, which may range up to 1000 pounds or more, may be used.

Treatment of the petroleum distillate is effected in any suitable manner and may be in a batch or continuous process. In a batch process the sour hydrocarbon distillate is introduced into a reaction zone containing the phthalocyanine catalyst, alkaline solution and the added salt, and air is introduced therein or passed therethrough. Preferably, the reaction zone is equipped with suitable stirrers or other mixing devices to obtain intimate mixing. In a continuous process the caustic solution containing phthalocyanine catalyst and the added salt is passed countercurrently to or concurrently with the sour petroleum distillate in the presence of a continuous stream of air. In a mixed type process, the reaction zone contains the alkaline solution, the added salt and phthalocyanine catalyst, and the sour distillate and air are passed continuously therethrough and removed, generally from the upper portion of the reaction zone.

In another embodiment of the invention, the catalyst is disposed as a fixed bed in the oxidation zone and the mercaptan, hydrocarbon distillate or other substrate containing the mercaptan is passed, together with alkaline solution and the added salt, at the desired temperature and pressure, into contact with the catalyst in either upward or downward flow. In this embodiment, the catalyst is prepared as a composite with a solid support. Any suitable support may be employed and preferably comprises activated charcoal, coke or other suitable forms of carbon. In some cases the support may comprise silica, alumina, magnesia, etc., or mixtures thereof. The solid catalyst is prepared in any suitable manner. In one method, preformed particles of the solid support are soaked in a solution containing the catalyst, after which excess solution is drained off and the catalyst is used as such or is subjected to a drying treatment, mild heating, blowing with air, hydrogen, nitrogen, etc., or successive treatments using two or more of these treatments prior to use. In other methods of preparing the solid composite, a solution of the phthalocyanine catalyst may be sprayed or poured over the particles of the solid support, or such particles may be dipped, suspended, immersed or otherwise contacted with the catalyst solution. The concentration of phthalocyanine catalyst in the composite may range from 0.1% to 10% by weight or more of the composite.

Regardless of the particular operation employed, the products are separated to recover disulfides and/or hydrocarbon distillate of reduced mercaptan content, as well as to separate alkaline reagent solution for reuse in the process. The added salt will be retained in the alkaline reagent solution and will be recycled therein within the process. When the alkaline solution is withdrawn and replaced, additional salt will be added to the alkaline solution as desired.

In some cases and particularly in the treatment of sour gasoline, a major proportion of the mercaptans is removed from the gasoline by extraction with an alkaline solution, and particularly caustic solution. This treatment readily is accomplished by either passing the sour gasoline in countercurrent contact with a descending stream of caustic solution or by passing the sour gasoline through a body of caustic solution. In a continuous process the caustic solution containing the mercapto compounds, as well as other acidic components, is subjected to regeneration by oxidizing the mercaptides to form disulfides and to recover the caustic for reuse in the process. Because of the use of the phthalocyanine catalyst, this regeneration is effected by oxidation, and air or other oxidizing gas is supplied to the regeneration zone. In accordance with the present invention, the added salt is incorporated in the caustic solution in order to accelerate the rate of the oxidation of the caustic solution. The regeneration of the caustic solution is effected at ambient temperature, although an elevated temperature which may range up to 200° F. or more may be employed when desired. The added salt is used in this embodiment in the same concentration as hereinbefore set forth. The regenerated caustic solution will contain disulfides formed in the regeneration, and the mixture is allowed to settle or otherwise treated to separate and remove the disulfides. The disulfides form as an upper layer and readily removed from the regenerated caustic solution for recycling of the latter.

In still another embodiment of the present invention, and particularly when treating gasoline, a major portion of the mercaptans is removed from the gasoline in the manner hereinbefore set forth and the thus partly treated gasoline, which is reduced in mercaptan content but is not doctor sweet, is subjected to final treating by oxidizing mercaptans contained therein in the manner hereinbefore set forth. The gasoline after the final treatment will be doctor sweet or substantially so and may be recovered as the final product of the combination process.

The following examples are introduced to illustrate further the novelty and utility of the present invention but not with the intention of unduly limiting the same.

*Example I*

This example describes the oxidation of tert-butyl mercaptan with air in the presence of caustic solution (sodium hydroxide) containing cobalt phthalocyanine sulfonate catalyst. The tertiary butyl mercaptan was dissolved in a concentration of 4.05 g. (0.45 mol) in 500 ml. of 1% by weight aqueous caustic solution containing 12.5 mg. of cobalt phthalocyanine sulfonate catalyst. The oxidation was effected with air at a temperature of 30° C. The time required to oxidize one-half of the mercaptans was 51 minutes.

In an otherwise identical experiment in which 71 g. (0.5 mol) of anhydrous sodium sulfate was dissolved in the caustic solution, the time required to oxidize one-half of the mercaptans was 24 minutes. Accordingly, it is noted that the rate of reaction was considerably accelerated and that the time required for equal reaction was cut practically in half.

*Example II*

In order to carefully follow the rate of oxidation, a synthetic mixture was prepared of isooctane containing tert-octyl mercaptan. When this mixture was subjected to oxidation with air in the presence of aqueous caustic solution containing 2% by weight of sodium hydroxide, the rate of oxidation was 0.0012 mol per liter per minute. In an identical run except that 0.5 mol per liter of sodium sulfate were included in the reaction mixture, the rate of oxidation increased to 0.0022 mol per liter per minute, which indicates almost a two-fold increase in the rate of oxidation.

*Example III*

The catalyst of this example comprises an aqueous caustic solution containing 8% by weight of sodium hydroxide, 250 parts per million of cobalt phthalocyanine sulfonate catalyst and 750 parts per million of sodium chloride. Sour cracked gasoline containing 0.006% by weight of mercaptan sulfur is subjected to sweetening by being passed, concurrently with air and the aqueous caustic solution containing the phthalocyanine catalyst and sodium chloride, into a reaction zone. The mixture is thoroughly mixed in the reaction zone at a temperature of 110° F. and a pressure of 25 pounds per square inch gauge. The rate of oxidation of the mercaptans is increased to more than 1.2 times that obtained in the absence of the sodium chloride.

*Example IV*

The catalyst of this example is aqueous potassium hydroxide solution of 12° Baumé, to which is added 75 parts per million of vanadium phthalocyanine sulfonate and 600 parts per million of potassium sulfate. This solution is used for the oxidation of a sour commercial kerosene having a boiling range of from about 370° to about 520° F., a mercaptan sulfur content of about 0.24% by weight and a Saybolt color of about 30. The oxidation is effected at 120° F. with air and an equal volume of potassium hydroxide solution containing the vanadium phthalocyanine sulfonate and potassium sulfate. The rate of oxidation of the mercaptans is increased to over 1.2 times that obtained in identical runs but in the absence of the potassium sulfate.

*Example V*

In a combination extraction, caustic regeneration and sweetening process, cracked gasoline having a mercaptan sulfur content of about 0.15% by weight is passed upwardly in countercurrent contact to a descending stream of 10 Baumé aqueous caustic solution containing 100 parts per million of cobalt phthalocyanine sulfonate catalyst and 950 parts per million of sodium nitrate. The treated gasoline is withdrawn from the upper portion of the treating zone and the used caustic solution containing mercaptides, phthalocyanine catalyst and sodium nitrate is withdrawn from the lower portion of the treating zone. The used caustic solution containing phthalocyanine catalyst and sodium nitrate is sent to a regeneration zone, to which air also is supplied. In the regeneration zone, oxidation of the sodium mercaptides to form disulfides is effected. Excess air is removed from the upper portion of the regeneration zone, while the regenerated caustic solution containing disulfides, phthalocyanine catalyst and sodium nitrate is withdrawn from the lower portion of the regeneration zone and sent to a settling zone. In the settling zone an upper layer of disulfides separates and is withdrawn. The regenerated caustic solution containing phthalocyanine catalyst and sodium nitrate is recycled to the extraction zone for further use in extracting mercaptans and other acidic components from cracked gasoline. Because of the presence of the sodium nitrate, the rate of oxidation of the sodium mercaptides is accelerated to greater than 1.2 times that obtained in the absence of sodium nitrate.

The partly treated gasoline from the extraction zone is sent to a sweetening zone. The gasoline entering the sweetening zone has a mercaptan content of about 0.01% by weight. In the sweetening zone the gasoline is passed concurrently with air and caustic solution containing cobalt phthalocyanine sulfonate catalyst and sodium nitrate. In this zone substantially complete sweetening of the gasoline is effected. The treated gasoline is subsequently separated from caustic solution, phthalocyanine catalyst and sodium nitrate, and the latter mixture is recycled to the sweetening zone for further use in treating additional gasoline. Here again the addition of sodium nitrate to the caustic solution accelerates the rate of oxidation of the mercaptans to greater than 1.2 times that obtainable in the absence of sodium nitrate.

*Example VI*

The sweetening process described in Example III is repeated except that the added salt is magnesium benzoate. Here again, the rate of oxidation of the gasoline is considerably increased due to the presence of the magnesium benzoate.

*Example VII*

In a sweetening reaction similar to that described in Example III, the aqueous alkaline solution contains 15% by weight of sodium hydroxide, 125 parts per million by weight of vanadium phthalocyanine sulfonate catalyst and 1500 parts per million by weight of calcium acetate. Here again, it will be seen that the calcium acetate serves to increase the rate of reaction to greater than 1.2 times that obtained in a similar reaction effected in the absence of calcium acetate.

*Example VIII*

Sweetening of sour cracked gasoline is effected in the same manner as described in Example VII except that lithium chloride is used in place of calcium acetate. Here again, it will be noted that the rate of oxidation of mercaptans is considerably increased due to the presence of the lithium chloride.

I claim as my invention:

1. In the oxidation of a mercapto compound by reaction thereof with an oxidizing agent in contact with a phthalocyanine catalyst, the method of increasing the rate of oxidation of the mercapto compound which comprises effecting said oxidation in the presence of a salt having a cation selected from the group consisting of a metal in the left-hand column of Group I and in the left-hand column of Group II of the Periodic Table and an anion selected from the group consisting of sulfate, halogen, nitrate, nitrite, carbonate, acetate and benzoate.

2. In the treating of a sour hydrocarbon distillate by reacting mercaptans contained in said distillate with an oxidizing agent in contact with a phthalocyanine catalyst, the method of increasing the rate of oxidation of the mercaptans which comprises effecting said oxidation in the presence of a salt having a cation selected from the group consisting of a metal in the left-hand column of Group I and in the left-hand column of Group II of the Periodic Table and an anion selected from the group consisting of sulfate, halogen, nitrate, nitrite, carbonate, acetate and benzoate.

3. In the oxidation of a mercaptan by reaction with air in contact with a phthalocyanine catalyst, the method of increasing the rate of oxidation which comprises effecting said oxidation in the presence of sodium sulfate.

4. In the oxidation of a mercaptan by reaction with air in contact with a phthalocyanine catalyst, the method of increasing the rate of oxidation which comprises effecting said oxidation in the presence of potassium sulfate.

5. In the oxidation of a mercaptan by reaction with air in contact with a phthalocyanine catalyst, the method of increasing the rate of oxidation which comprises effecting said oxidation in the presence of sodium chloride.

6. The method of increasing the rate of oxidation of mercaptans contained in sour hydrocarbon distillate which comprises reacting mercaptans contained in said distillate with air in contact with alkaline solution containing cobalt phthalocyanine sulfonate catalyst and sodium sulfate.

7. The method of increasing the rate of oxidation of mercaptans contained in sour hydrocarbon distillate which comprises reacting mercaptans contained in said distillate with air in contact with alkaline solution containing cobalt phthalocyanine sulfonate catalyst and potassium sulfate.

8. The method of increasing the rate of oxidation of mercaptans contained in sour hydrocarbon distillate which comprises reacting mercaptans contained in said distillate with air in contact with alkaline solution containing vanadium phthalocyanine sulfonate catalyst and sodium sulfate.

9. The method of increasing the rate of oxidation of mercaptans contained in sour hydrocarbon distillate which comprises reacting mercaptans contained in said distillate with air in contact with alkaline solution containing vanadium phthalocyanine sulfonate catalyst and potassium sulfate.

10. The method of accelerating the rate of oxidation of mercaptans contained in sour hydrocarbon distillate which comprises reacting mercaptans contained in said distillate with air in contact with caustic solution, cobalt phthalocyanine sulfonate catalyst and sodium sulfate.

11. The method of accelerating the rate of oxidation of mercaptans contained in sour hydrocarbon distillate which comprises reacting mercaptans contained in said distillate with air in contact with potassium hydroxide solution, cobalt phthalocyanine sulfonate catalyst, and potassium sulfate.

12. The method of accelerating the rate of oxidation of mercaptans contained in sour hydrocarbon distillate which comprises reacting mercaptans contained in said distillate with air in contact with caustic solution, cobalt phthalocyanine sulfonate catalysts and sodium chloride.

13. The method of accelerating the rate of oxidation of mercaptans contained in sour hydrocarbon distillate which comprises reacting mercaptans contained in said distillate with air in contact with caustic solution, cobalt phthalocyanine sulfonate catalyst and sodium nitrate.

References Cited

UNITED STATES PATENTS

| | | | |
|---|---|---|---|
| 2,966,452 | 12/1960 | Gleim | 208—206 |
| 2,999,806 | 9/1961 | Thompson | 208—206 |
| 3,252,891 | 5/1966 | Gleim | 208—206 |

DELBERT E. GANTZ, *Primary Examiner.*

R. H. SHUBERT, G. J. CRASANAKIS,
*Assistant Examiners.*